US 12,003,175 B2

(12) United States Patent
Seo et al.

(10) Patent No.: US 12,003,175 B2
(45) Date of Patent: Jun. 4, 2024

(54) HYBRID CONVERTER WITH REDUCED INDUCTOR LOSS

(71) Applicant: The Regents of the University of Colorado, a body corporate, Denver, CO (US)

(72) Inventors: Gabsu Seo, Boulder, CO (US); Hanh-Phuc Le, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 3 days.

(21) Appl. No.: 16/305,806

(22) PCT Filed: May 31, 2017

(86) PCT No.: PCT/US2017/035282
§ 371 (c)(1),
(2) Date: Nov. 29, 2018

(87) PCT Pub. No.: WO2017/210340
PCT Pub. Date: Dec. 7, 2017

(65) Prior Publication Data
US 2020/0328675 A1    Oct. 15, 2020

Related U.S. Application Data

(60) Provisional application No. 62/455,413, filed on Feb. 6, 2017, provisional application No. 62/343,162, filed on May 31, 2016.

(51) Int. Cl.
*H02M 3/07* (2006.01)
*H02M 3/155* (2006.01)
(52) U.S. Cl.
CPC ........... *H02M 3/073* (2013.01); *H02M 3/155* (2013.01)

(58) Field of Classification Search
CPC .. H02M 3/073; H02M 3/1582; H02M 3/1584; H02M 2001/4291; H02M 2003/077; H05B 45/375; H02P 2201/11
See application file for complete search history.

(56) References Cited

U.S. PATENT DOCUMENTS 5,606,491 A * 2/1997 Ellis ................. H02M 3/07
363/59
6,437,999 B1 * 8/2002 Wittenbreder ........ H02M 3/158
363/39

(Continued)

FOREIGN PATENT DOCUMENTS

EP    1562279 A2    8/2005
JP    2013-021837 A  1/2013

(Continued)

OTHER PUBLICATIONS

International Search Report and Written Opinion for PCT/US17/35282, dated Aug. 28, 2017, 11 pages.

(Continued)

*Primary Examiner* — Emily P Pham
(74) *Attorney, Agent, or Firm* — WORKMAN NYDEGGER

(57) ABSTRACT

A hybrid converter achieves high efficiency with an inductor positioned at the lower current path that significantly decreases inductor loss by having the DC component of inductor current reduced. The circuit also features reduced inductance requirement by reducing the voltage swing blocked by the inductor. As a result, it turns to benefit of both efficiency improvement and better integration. Less voltage stress for switches is also an important advantage to switching loss reduction and switching frequency increase which in turns enables passive component size reduction. The circuit in this invention can be realized for both step-down and step-up power conversion as well as bidirectional power (Continued)

flow is available. For simplicity and cost, some of switches can be replaced with passive switches such as diodes which highly simplifies the converter circuit implementation.

1 Claim, 18 Drawing Sheets

(56) References Cited

U.S. PATENT DOCUMENTS

| | | | |
|---|---|---|---|
| 6,963,497 B1 | 11/2005 | Herbert | |
| 7,394,231 B2 | 7/2008 | Flatness et al. | |
| 8,692,368 B2 | 4/2014 | Pan et al. | |
| 9,054,576 B2* | 6/2015 | Kang | H02M 3/07 |
| 9,236,796 B2* | 1/2016 | Liu | H02M 3/1588 |
| 9,559,589 B2* | 1/2017 | Petersen | H05B 45/37 |
| 10,027,223 B1* | 7/2018 | Zhang | H02M 3/07 |
| 10,541,603 B2* | 1/2020 | Puggelli | H02M 3/158 |
| 11,264,806 B2* | 3/2022 | Urabe | H02J 3/381 |
| 2009/0278520 A1 | 11/2009 | Perreault et al. | |
| 2009/0322384 A1* | 12/2009 | Oraw | H02M 3/07 |
| | | | 327/112 |
| 2012/0069604 A1* | 3/2012 | Yagyu | H02M 1/34 |
| | | | 363/20 |
| 2012/0112724 A1 | 5/2012 | Nishida | |
| 2012/0187932 A1* | 7/2012 | Singnurkar | H02M 3/07 |
| | | | 323/282 |
| 2012/0200163 A1* | 8/2012 | Ito | H02J 7/0014 |
| | | | 307/77 |
| 2012/0294056 A1 | 11/2012 | Temesi et al. | |
| 2013/0229839 A1* | 9/2013 | Escobar | H02M 1/12 |
| | | | 363/40 |
| 2013/0229841 A1* | 9/2013 | Giuliano | H02M 3/158 |
| | | | 363/60 |
| 2014/0184189 A1 | 7/2014 | Salem | |
| 2014/0306673 A1 | 10/2014 | Le et al. | |
| 2014/0376268 A1 | 12/2014 | Manthe et al. | |
| 2015/0097546 A1* | 4/2015 | Pan | H02M 3/1584 |
| | | | 323/311 |
| 2015/0155895 A1* | 6/2015 | Perreault | H02M 3/07 |
| | | | 330/297 |
| 2015/0263612 A1 | 9/2015 | Wu et al. | |
| 2016/0056714 A1 | 2/2016 | Ek | |
| 2016/0094214 A1 | 3/2016 | Liu et al. | |
| 2017/0207723 A1 | 7/2017 | Zhang et al. | |
| 2020/0328676 A1 | 10/2020 | Le et al. | |

FOREIGN PATENT DOCUMENTS

| | | |
|---|---|---|
| WO | 01/42869 A2 | 6/2001 |
| WO | 2012/151466 A2 | 11/2012 |
| WO | 2013/125004 A1 | 8/2013 |
| WO | 2015/039708 | 3/2015 |

OTHER PUBLICATIONS

International Search Report and Written Opinion for PCT/US17/35184, dated Aug. 29, 2017, 16 pages.

* cited by examiner

HYBRID CONVERTER WITH REDUCED INDUCTOR LOSS

CROSS-REFERENCE TO RELATED APPLICATIONS

This application claims the benefit of U.S. provisional application No. 62/343,162 entitled "Smart Cable and Methods Thereof" and filed May 31, 2016 and U.S. provisional application No. 62/455,413 entitled "Hybrid Converter" and filed on Feb. 6, 2017, each of which is hereby incorporated by reference as though fully set forth herein.

TECHNICAL FIELD

This disclosure relates to a hybrid converter that merges advantages of switched inductor-based and capacitor-based converters with fewer semiconductor switches to achieve high efficiency and better integration.

BACKGROUND

Buck converter topology has been widely adapted in various DC-DC conversion applications due to its simplicity and higher efficiency than linear regulators that steps down input voltage to output voltage by burning out power on a controllable resistor. In fact, a Buck converter is extensively used in personal computer and server applications. From a bus voltage e.g. 12V, a Buck converter supplies power to loads, such as microprocessors. Also, a Buck converter is used in applications for mobile devices to charge Li-ion batteries, at −3.0 V to 4.5V, from a 5V input.

As shown in FIG. 1A, a Buck converter 100 has a switch 104, a current rectifying diode 105, an inductor 106 and output capacitor 107. In a more popular variation, a Buck converter can have a switch, in place of diode 105, that is operated synchronously with switch 104 and form a half bridge implementation for synchronous rectification in order to achieve better efficiency. However, in some applications that require better integration and efficiency, the conventional Buck converters are not suitable due to two drawbacks. The first drawback is the relatively large voltage swing across the inductor as the switch node voltage $V_X$ 102 swings between zero to input voltage $V_{IN}$ 101 as shown in FIG. 1B. This large swing of $V_X$ requires an inductor 106 having a larger inductance value to achieve low inductor current ripple. In the same form factor, an increase in inductance leads to increased equivalent series resistance (ESR) of the inductor and thus increased copper loss. As the inductor carries the average output current Io 109 in the Buck converter, the inductor copper loss is significant because it is proportional to the square of the current expressed as $$P_{cond} = R_L I_{L\_rms}^2 \qquad (1)$$

where $R_L$ and $I_{L\_rms}$ are the equivalent series resistance of the inductor and the root mean square (RMS) value of the inductor current $I_L$ 108. The second drawback of a Buck converter is that switch Q 104 and diode D 105 need to block the input voltage $V_{IN}$ 101. This imposes the need for high breakdown voltage devices, which leads to either higher switch on-resistance or parasitic capacitance given the same form factor. This contributes to efficiency decrease of the switching regulator.

These two drawbacks of the conventional Buck converter 100 are effectively addressed by a three level Buck converter 200, such as illustrated in FIG. 2A. By reducing the voltage swing at $V_X$ 204 to half of the input voltage $V_{IN}$ 201 and the interleaving effect that makes the effective switching frequency for inductor double, the reliance on inductance is significantly reduced. As a result, the three level Buck converter can enjoy improved efficiency and better integration as pointed out in an article titled "A fully-integrated 3-level DC-DC converter for nanosecond-scale DVFS," published in IEEE Journal of Solid-State Circuits (JSSC) in January 2012, by Wonyoung Kim et al. In addition, by dividing the input voltage $V_{IN}$ 201 into half of input voltage using two capacitors $C_1$ 202 and $C_2$ 203, the voltage sustained by switches $Q_1$ 209 and $Q_2$ 210 and diodes $D_1$ 211 and $D_2$ 212 is half of that of conventional Buck converter, which is beneficial to alleviating switching loss of semiconductor devices because the loss is expressed as $$P_{switch} = \frac{1}{2} C_{DS} V_{DS}^2$$

where $C_{DS}$ and $V_{DS}$ are equivalent drain-source capacitance and the voltage applied to semiconductors during their off times. Therefore, a three level Buck converter can achieve better efficiency and shows better potential for integration.

The three level Buck converter 200 reduces inductor voltage swing and semiconductor voltage stress. However, it has several demerits. One of the major loss factor of Buck converter is the loss associated with inductor. Even though the three level Buck converter can help to alleviate the inductor loss by reducing the required inductance resulting in less copper loss with decreased ESR, it still undesirably has to carry the full output current and the related loss. Second, the minimum number of active switches required to operate the circuit is two, twice that of a conventional Buck converter, as the three level Buck converter needs one additional active switch to ensure the charge balance between $C_1$ 202 and $C_2$ 203. This is also discussed in the article titled "Fundamental considerations of three-level dc-dc converters: Topologies, analyses, and control," published in the IEEE Transactions on Circuits and Systems I in December 2008, by Xinbo Ruan et al.

To overcome the limitations of switched inductor-based converters, switched capacitor (SC) converters can be introduced. The SC converters show easier integration due to lack of magnetic components. The SC converters operate with high efficiency when the output voltage is predetermined fraction of input voltage i.e. ½, ⅓, and ⅔. However, as the voltage conversion ratio changes, the efficiency of SC converters decreases. This fact is also discussed and clearly demonstrated in the article titled "'Design Techniques for Fully Integrated Switched-Capacitor DC-DC Converters," published in the IEEE Journal of Solid-State Circuits in September 2011, by Hanh-Phuc Le et al.

To overcome the drawback of SC converters and Buck converters, hybrid converters that cascade the two kinds of converters have been proposed. Using the hybrid structure, the output voltage can be tightly regulated with reasonable efficiency. However, the increase of number of components, specifically the number of switches, makes the converter circuitry more complex. Also, sometimes the efficiency degradation due to the multiple stage power processing is not desirable.

FIG. 2C shows a circuit design described in U.S. Pat. No. 9,143,032 B2 issued Sep. 22, 2105 and entitled "Apparatus, systems, and methods for providing a hybrid power regulator" to Hanh-Phuc Le et al., which is incorporated by reference herein. The circuit employs a flying switched inductor regulator 111 at a front end that enables significantly reducing the voltage swing $v_x$ 119. With the flying switched inductor regulator, a position of the inductor 115 at the input side of the circuit leads to significantly reduced inductor loss and better integration. However, the additional switches 113 and 114 that are put in series in the main power flow from the inductor to the following step-down regulator increases not only the circuit complexity but also switch conduction loss.

Besides, regarding the step-up power conversion, same discussion above is still valid as the boost converter has the same structure with Buck only except the opposite positions of source and load. As the inductor of boost converter is equally forced to carry high current, the input current in case of step up, the same demerit of boost type converters still exists.

SUMMARY

A hybrid converter having its inductor at a low current side of the converter—at the input side in the case of a step-down converter and at the output side in the case of a step-up converter—that can achieve load regulation with improved efficiency is provided. The other side of the converter can be handled by a network with a reduced or minimum number of switches and capacitors.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

In various embodiments, a hybrid converter having its inductor at a its low current side of the converter—at the input side in the case of a step-down converter and at the output side in the case of a step-up converter—that can achieve load regulation with improved efficiency is provided. The other side of the converter can be handled by a network with a reduced or minimum number of switches and capacitors.

Figure 3A:
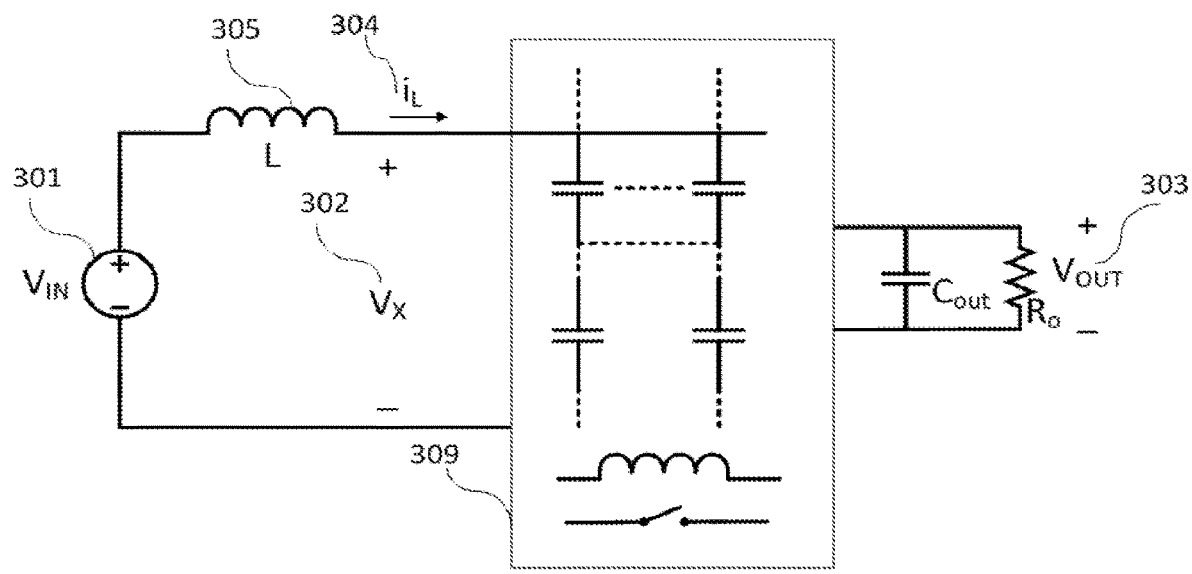
FIG. 3A shows a schematic drawing of an example of a hybrid converter circuit arrangement of a step-down converter, according to one or more embodiments shown and described herein.

FIG. 3A, for example, shows a conceptual circuit schematic representation of an example embodiment of a hybrid converter configured for step-down conversion. In this particular embodiment, for example, an inductor L 305 is connected to an input of the converter circuit right after an input voltage source 301. A switched multiple capacitor network 309 follows the inductor L 305. In this embodiment, the inductor L 305 is directly connected to one or a plural number of capacitors of the switched multiple capacitor network 309. The switched multiple capacitor network 309 can include one or more switches to achieve desired operation of the switched capacitor network 309 and some of the switch(es) can be realized by diodes for simplicity of control. In some cases, one or a plural number of inductors L 305 can be used to enhance the circuit operation. The switched multiple capacitor network is also connected to an output stage. In this embodiment, the output stage includes a filtering capacitor $C_{out}$ disposed across an output voltage $V_{OUT}$ 303.

Figure 3B:
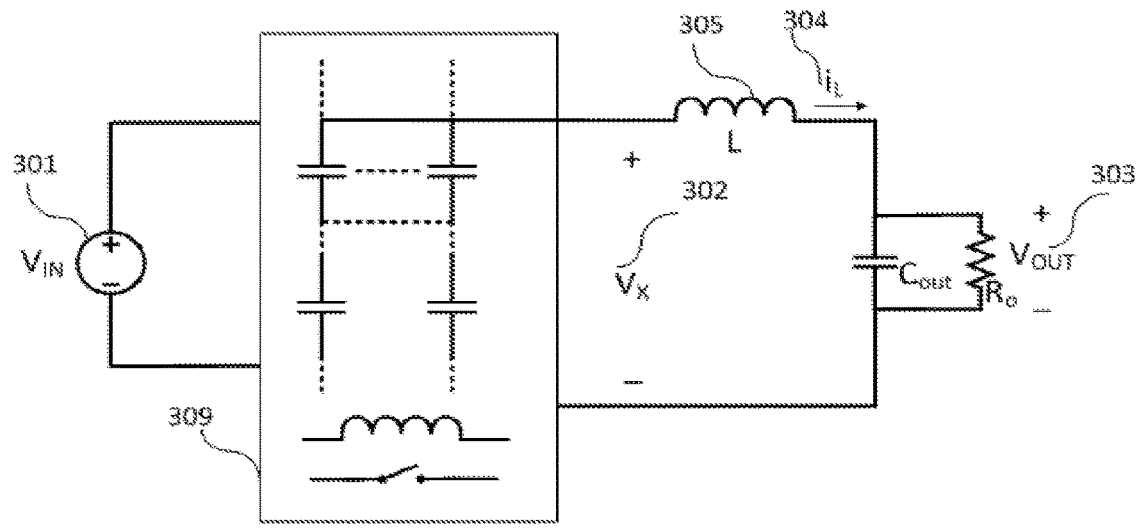
FIG. 3B shows a schematic drawing of another example of a hybrid converter circuit arrangement of a step-up converter, according to one or more embodiments shown and described herein.
Figure 3C:
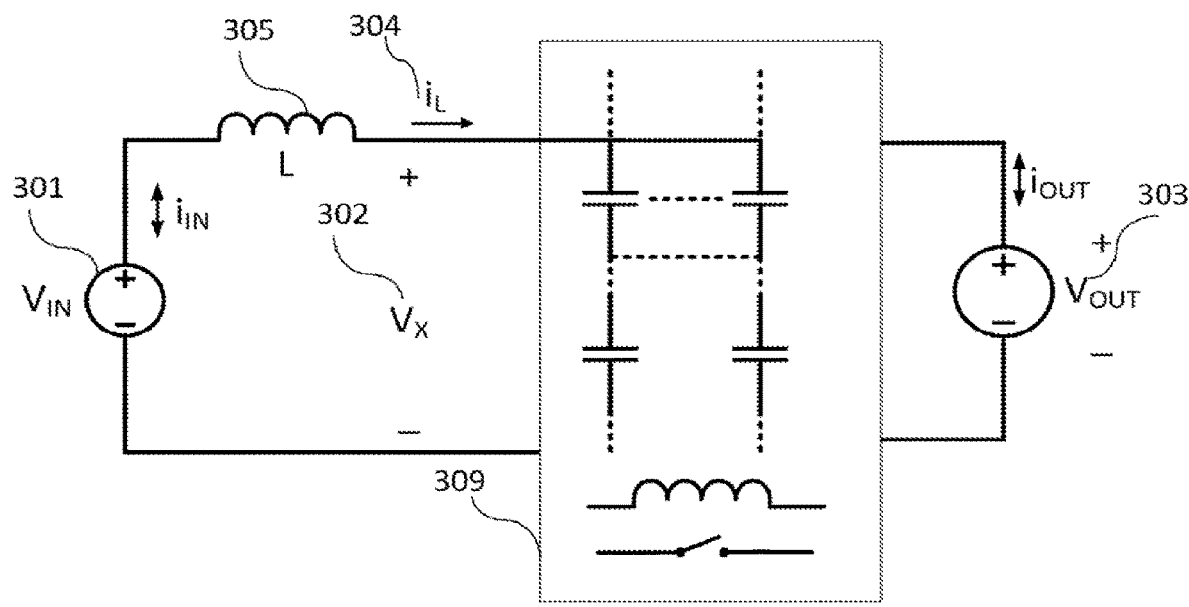
FIG. 3C shows a schematic drawing of yet another example hybrid converter circuit arrangement of a bidirectional converter circuit, according to one or more embodiments shown and described herein.

Although FIG. 3A shows an example embodiment of a step-down converter, a hybrid converter design similar to that shown in FIG. 3A can also be used for step-up power conversion and bidirectional power flow as shown in FIG. 3B and FIG. 3C, respectively. In the example step-up hybrid converter embodiment shown in FIG. 3B, for example, the inductor L 305 is connected to an output stage of the converter circuit after a switched multiple capacitor network 309, which is in turn coupled to an input voltage source 301. As described with reference to FIG. 3A, the inductor L 305 can be directly connected to one or a plural number of capacitors of the switched multiple capacitor network 309. The switched multiple capacitor network 309 can include one or more switches to achieve desired operation of the switched capacitor network 309 and some of the switch(es) can be realized by diodes for simplicity of control. In some cases, one or a plural number of inductors L 305 can be used to enhance the circuit operation. Again, in this embodiment, the output stage includes a filtering capacitor $C_{out}$ disposed across an output voltage $V_{OUT}$ 303.

In FIG. 3C, yet another embodiment of a hybrid converter design includes bidirectional power-flow operations. In this embodiment, the hybrid converter circuit is configured in a similar manner as the converter shown in FIG. 3A, except that $V_{OUT}$ 303 and $V_{IN}$ 301 may switch their function from a load to a power source and vice versa, dependent on external connections of the power source and load and on the operation of the network 309.

In some realizations of the circuits shown in FIGS. 3A through 3C, the inductor 305 can also be positioned between negative side of a source and a switched multiple capacitor network 309. In this case, $V_{IN}$ 301 is directly connected to one or a plural number of capacitors of the switched multiple capacitor network 309 that leads same benefit of switch number reduction. Also, in some realizations, the inductor 305 can be implemented by a plurality of inductors and one or more inductors can be put either on the positive terminal side or the negative terminal side of source.

A switched multiple capacitor network 309, such as the ones shown in FIGS. 3A-3C, can be constructed in some embodiments by one or more switched capacitor circuits to switch the switching node voltage vx 302. Common switched capacitor circuits such as ladder, series-parallel, doubler, Fibonacci, or Dickson or any other type of switched capacitor circuit can be used to construct a switched multiple capacitor network 309. As the structure and operation of the multiple switched capacitor circuit changes, the fundamental characteristic such as input-to-output voltage conversion ratio M may also change.

The circuit 309 can also include one or more additional inductors to provide additional soft-charging operation for the multiple switched capacitor circuits to improve overall efficiency.

Figure 3D:
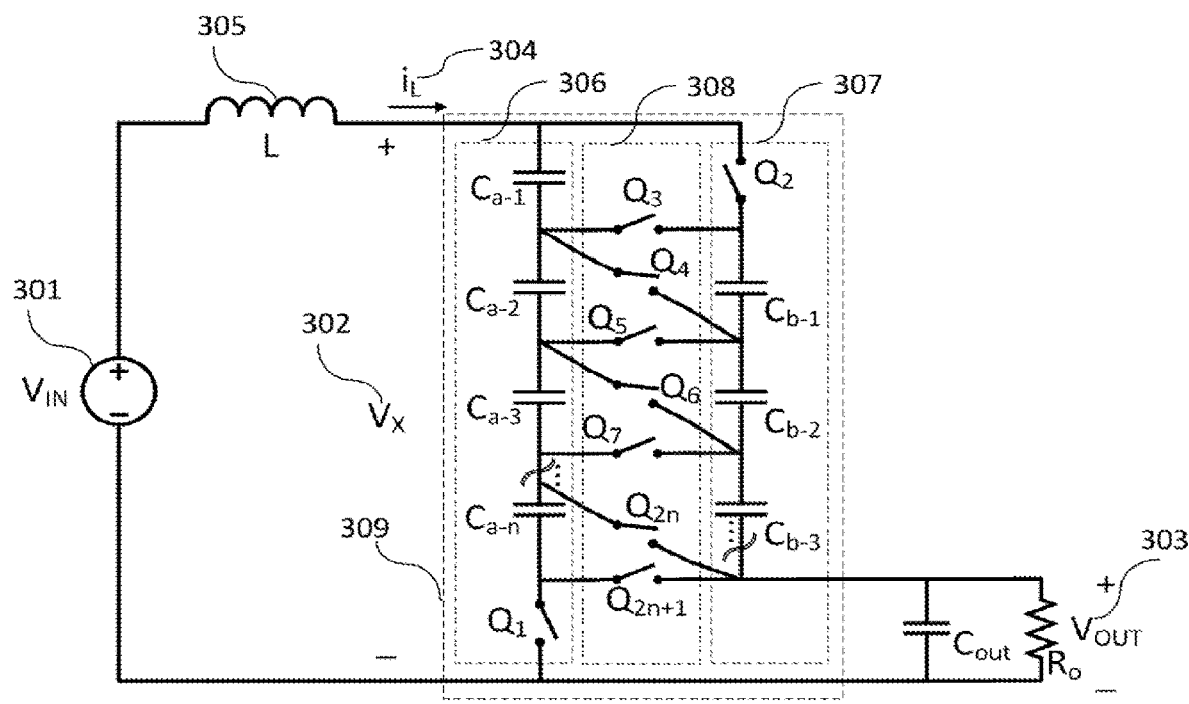
FIG. 3D shows a schematic drawing of another example hybrid converter circuit implementation with ladder structure, according to one or more embodiments shown and described herein.

Another example embodiment of a hybrid converter circuit includes a step-down converter, such as illustrated in FIG. 3D. In the example embodiment shown in FIG. 3D, for example, a ladder switched capacitor circuit may be used to construct a functional block of a multiple switched capacitor circuit 309. In this embodiment, for example, the circuit employs an inductor L 305 at its input side coupled between an input voltage source $V_{IN}$ 301 and the multiple switched capacitor circuit 309. Two series connections of capacitors and switches are provided in the multiple switched capacitor circuit 309. The first series connection 306 includes multiple capacitors, $C_{a-1}$, $C_{a-2}$, $C_{a-3}$, . . . $C_{a-n}$, and a switch $Q_1$ in series. A first end of the series connection 306 is connected to the inductor L 305 and a second end of the series connection (at the switch Q1) is connected to a negative terminal of the voltage source $V_{IN}$ 301. A second series connection including a switch $Q_2$ and capacitors, $C_{b-1}$, $C_{b-2}$, $C_{b-3}$, . . . , $C_{b-n-1}$, 307 is also connected to the same inductor L 305 and the voltage source 301 as illustrated in FIG. 3D. Between the two series connections, 306 and 307, a switch network 308 is located to complete this particular embodiment of the multiple switched capacitor circuit construction. In this particular embodiment, the switches $Q_3$ to $Q_{2n+1}$ in the switch network 308 are configured to provide a continuous half bridge structure referring to each capacitor as shown in FIG. 3D. Switches $Q_2$ and $Q_3$ make a half bridge structure referring to $C_{a-1}$ with its midpoint connected to $C_{b-1}$ and switches $Q_3$ and $Q_4$ again make another half bridge for $C_{b-1}$ and this construction continues until it reaches $C_{a-n}$. The load is connected to $C_{out}$ in FIG. 3D but it can be also connected in parallel with another capacitor or multiple series capacitors in 306 or 307. However, in this embodiment, the load is located referring to the same ground of $Q_1$ for ease of control and switch drive.

Figure 4:
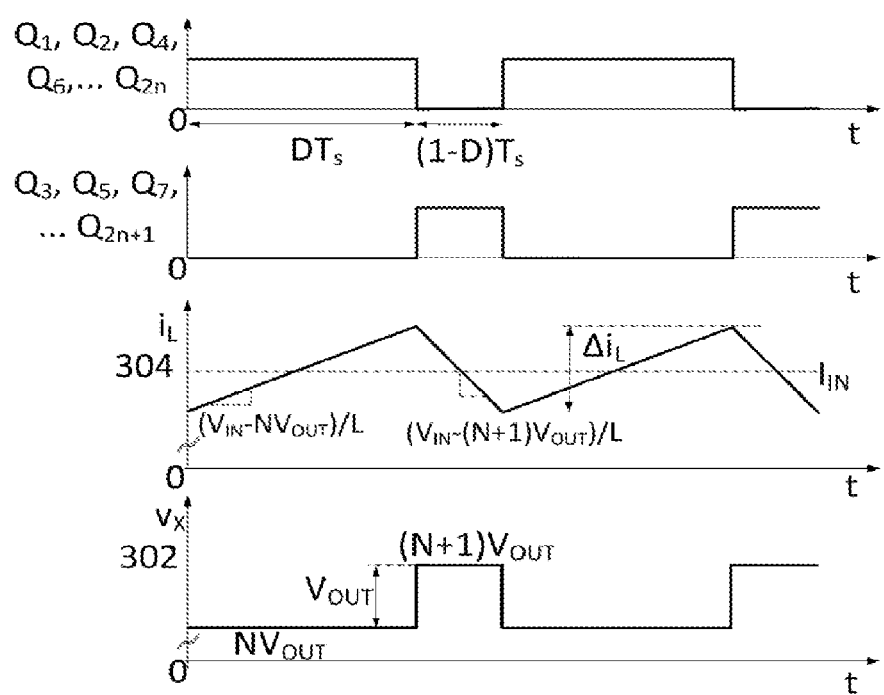
FIG. 4 illustrates example operation waveforms of a hybrid converter circuit, according to one or more embodiments shown and described herein.

In this particular embodiment, for example, only two switch control signals for all of the semiconductor switches are required for the converter control. The two control signals can be complementary with dead-time when both control signals turn off switches. The first control signal, for example, may be tied to the switches $Q_1$, $Q_2$, $Q_4$, $Q_6$, ... and $Q_{2n}$ while the second control signal may be tied to the remainder of the switches, $Q_3$, $Q_5$, $Q_7$, $Q_9$, ... and $Q_{2n+1}$. A duty cycle D, for example, can be used to define the turn-on time of the first control signal as illustrated in FIG. 4, or the second control signal in case of a step-up configuration illustrated in FIG. 8, which will be described in more detail below. The duty cycle D can be used to determine the converter input to output voltage ratio, thus can be used as a control signal to tightly regulate the load.

Figure 2A:
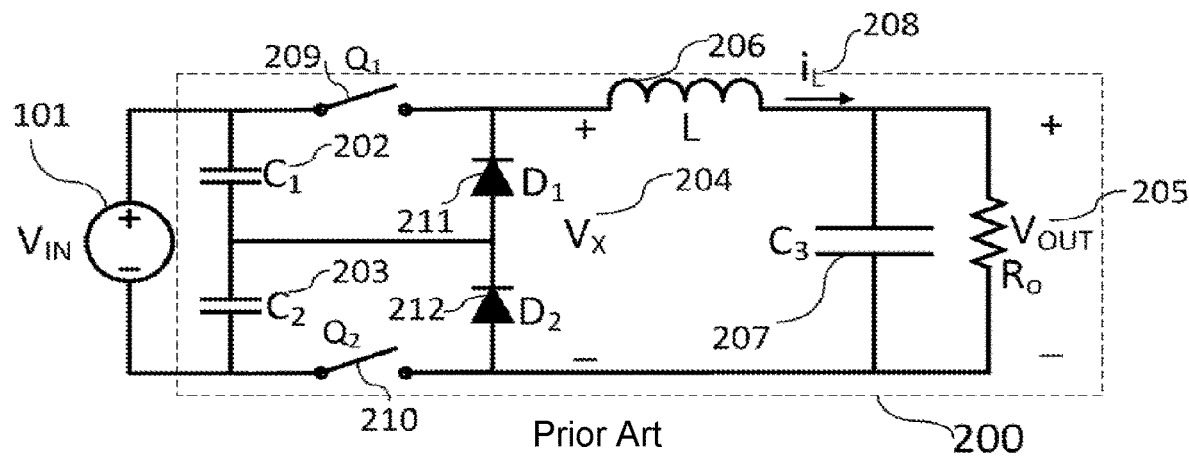
FIGS. 2A and 2B illustrate an example three-level Buck converter and its operation waveforms, respectively.
Figure 2B:
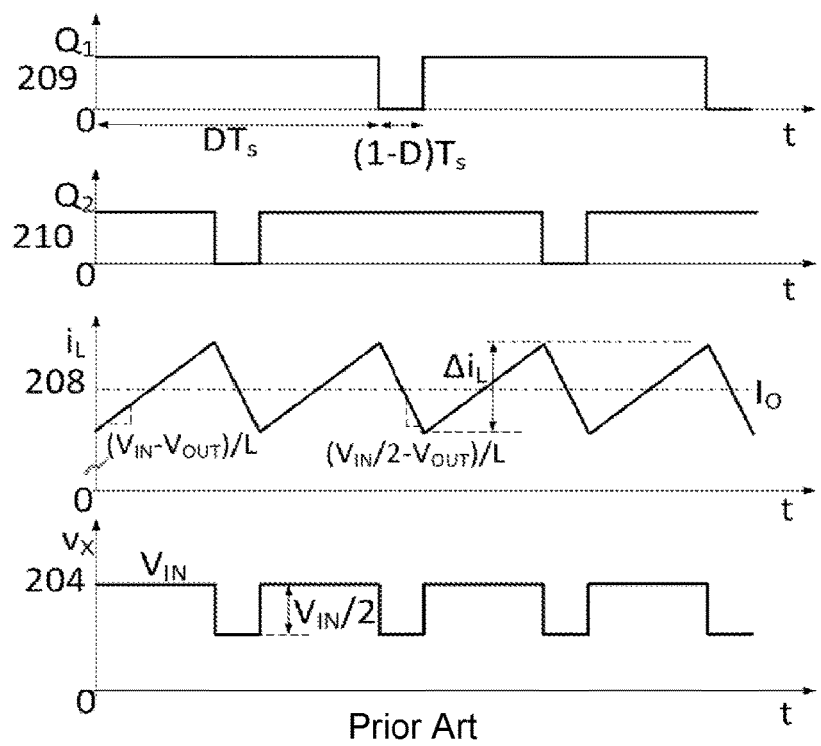
Figure 2C:
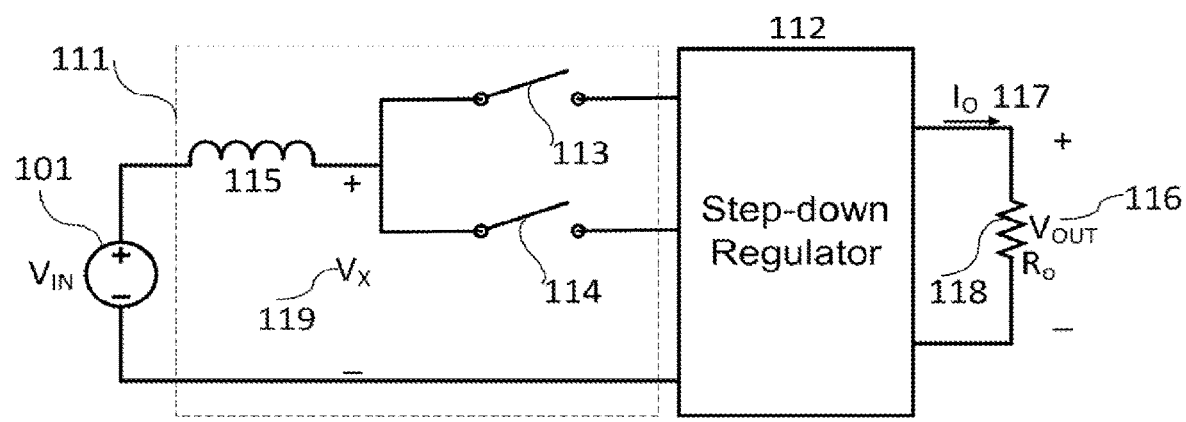
FIG. 2C illustrates an example flying switched inductor regulator hybrid converter circuit.

Compared to the design shown in FIG. 2C published in U.S. Pat. No. 9,143,032 B2 on Sep. 22, 2015 to Hanh-Phuc Le et al., the circuit a hybrid converter such as shown in FIGS. 3A to 3C requires no dedicated switches 113 and 114 for the flying switched inductor regulator 111 in the circuit shown in FIG. 2C. In the example embodiments shown in FIGS. 3A to 3C, however, an inductor L 305 can be directly connected to a top flying capacitor of a switched capacitor network, allowing the inductor L 305 operation to be synchronized and controlled by the following switched capacitor network 309. As the operations of the two stages (flying inductor and switched capacitor network) are merged, the number of switches can be reduced or even minimized, leading to lower switching and conduction losses. Control design, including switch drivers and regulation, can also be simpler and more energy efficient.

Figure 5A:
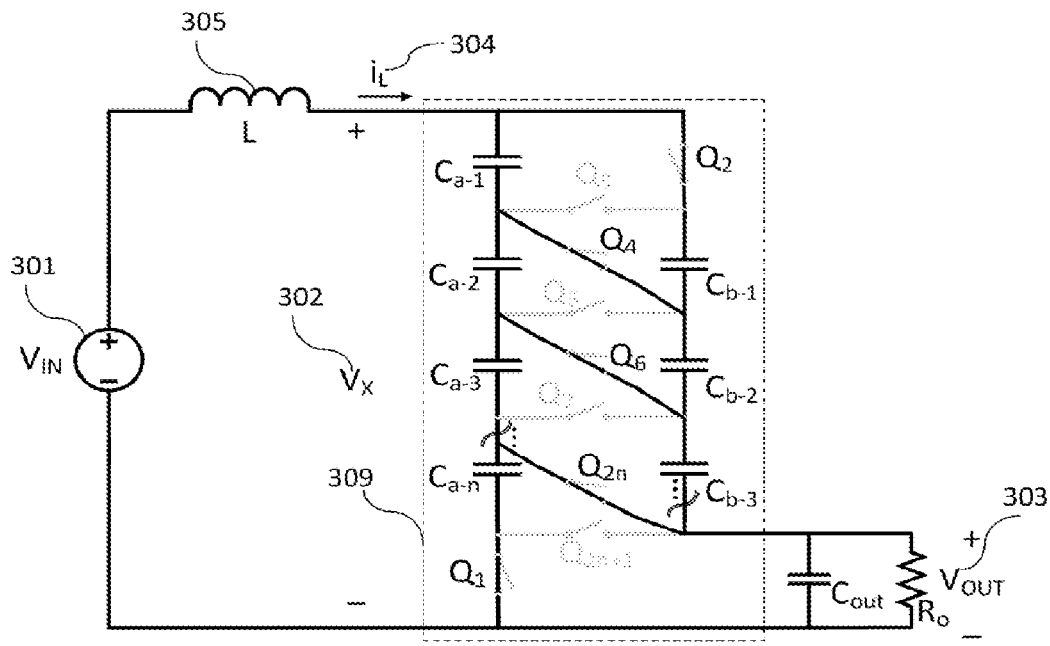
FIGS. 5A and 5B illustrate example equivalent circuits of a hybrid converter circuit during on/off time, according to one or more embodiments shown and described herein.
Figure 5B:
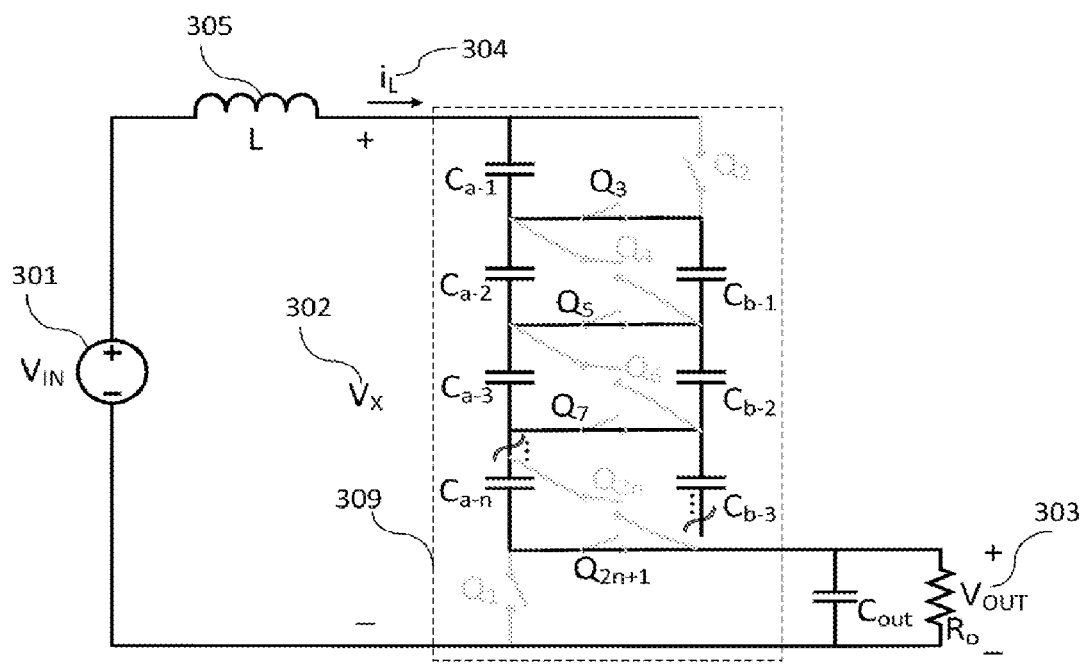
Figure 6:
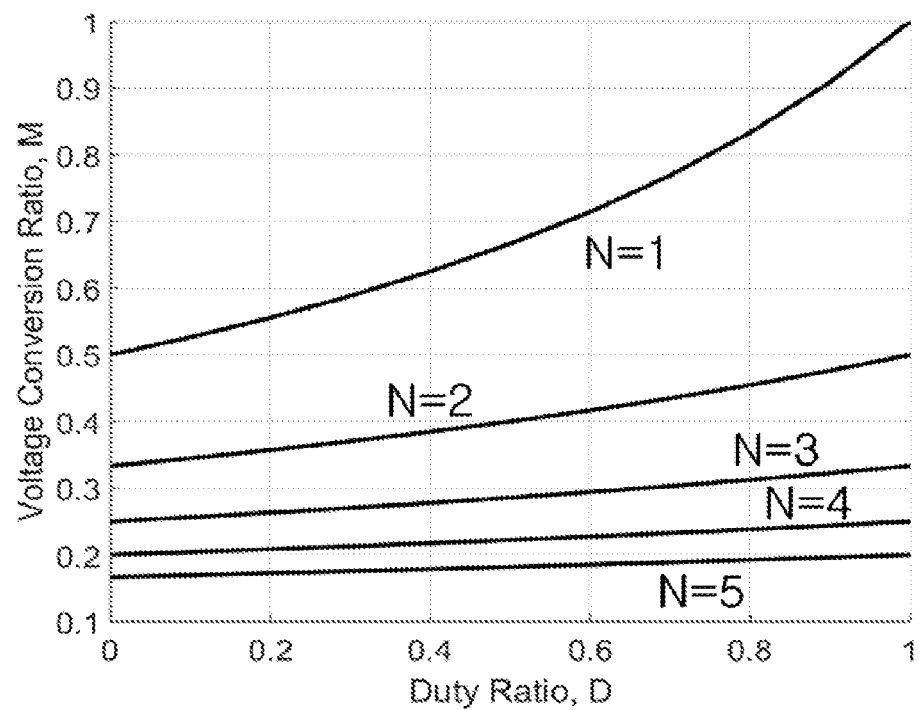
FIG. 6 illustrates a graph of an example voltage conversion ratio as a function of a duty cycle, according to one or more embodiments shown and described herein.

In some embodiments, for example, following the switch control signals, the switching node voltage $V_X$ 302 can be modulated, thus modulating the inductor current as shown in FIG. 4. In a steady-state operation, all the voltages of the capacitors can ideally be equalized. Two equivalent circuits are illustrated in FIGS. 5A and 5B according to the control signal states. As illustrated in FIG. 4, the inductor charges by $(V_{IN}-NV_{OUT})$ during DTs and discharges by $(V_{IN}-(N+1)V_{OUT})$ during $(1-D)Ts$. An input to output voltage ratio can be derived using the inductor voltage second balance with an assumption that the converter operates in steady state and a small ripple approximation. A general voltage ratio for this circuit can be expressed as $$M = \frac{V_{OUT}}{V_{IN}} = \frac{1}{(N+1)-D}$$

where M is the input to output voltage conversion ratio ranging from $1/(N+1)$ to $1/N$ and N is the number of capacitors stacked in series connections 306. As illustrated in FIG. 6, a voltage conversion ratio range of this circuit differs according to factor N.

Figure 1A:
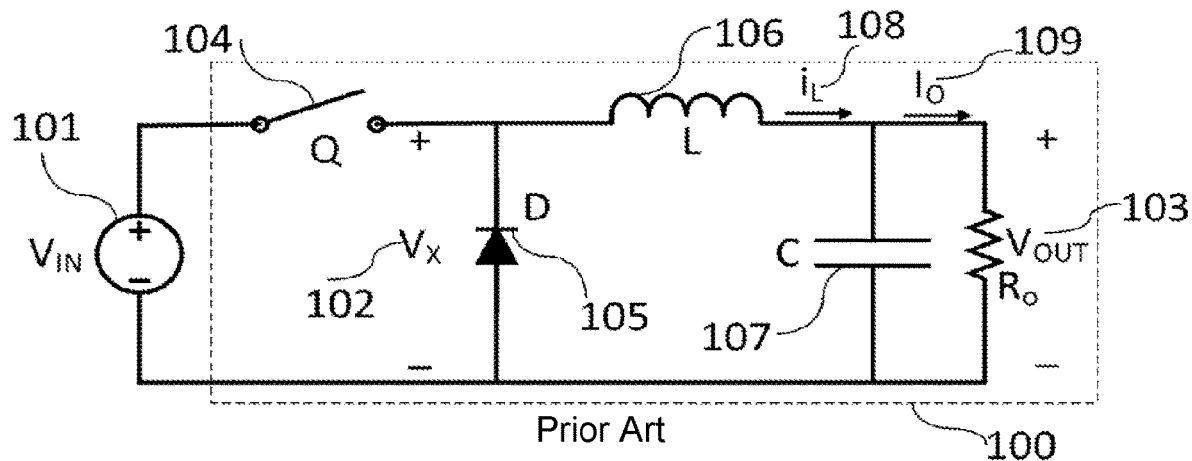
FIGS. 1A and 1B illustrate an example Buck converter and its operation waveforms, respectively.
Figure 1B:
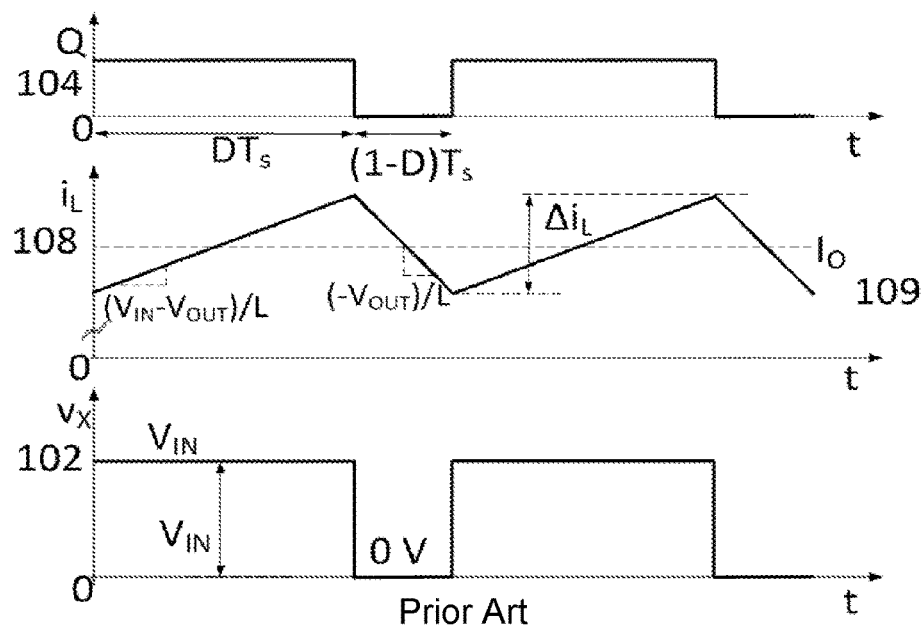

In this example, the converter's efficiency improvement is significant as the inductor L 305 is positioned at the input side of the converter. A conventional step-down converter such as a Buck converter having its inductor 106 at an output side of the converter as shown in FIG. 1A forces the inductor 305 to carry the whole amount of output current, which is higher than the input current because $$I_O = \frac{1}{M} I_{IN}$$

in a lossless assumption, i.e. 100% efficiency, where $I_{IN}$ is the input current of a converter. On the other hand, the hybrid step-down converter circuit, such as those shown in FIGS. 3A and 3C enables the inductor to carry a fraction of the output current that is the input current $I_{IN}$. In a step-up conversion configuration shown in FIG. 3B, the hybrid architecture allows the inductor to carry the output current which in this case is a fraction of the in current from $V_{IN}$ 301. As the inductor resistive/copper loss is proportional to the square of the RMS value of the inductor current, the inductor-related loss factor is significantly reduced in these hybrid converter circuits. In addition, as shown in FIG. 4, the voltage swing at $V_X$ 302 is limited to $V_{OUT}$ that is smaller than that of Buck converter, $V_{IN}$, and dramatically further decreases as the input to output voltage ratio M decreases. This feature is beneficial to reducing losses of both inductors and semiconductors.

The reliance on high inductance in inductor-based converters can be a detrimental factor as the loss related to inductor, which is dominant in converter total loss, highly depends on inductor current ripple and DC current it carries. If the reliance is reduced, the inductor loss factor decreases because less inductance results in smaller ESR that contributes to efficiency improvement. Therefore, the reliance on the inductance of a converter can be used as an indicator to recognize its effectiveness to address loss of inductors. In contrast, hybrid converters, such as those provided, features less reliance on the inductance as it shows superior inductor DC current and ripple. As mentioned earlier, the DC current is reduced by a factor M as the inductor is positioned at the input side. In addition, the inductor ripple is also highly reduced compared to a standard Buck converter in the same operating condition. The inductor ripple of an example hybrid converter circuit can be derived as $$\Delta i_{L,Hybrid} = \frac{V_{IN} T_s}{L} \frac{(1-D)D}{(N+1-D)}$$

while the inductor current ripple of Buck converter can be expressed as $$\Delta i_{L,Buck} = \frac{V_{IN} T_s}{L} (1-D)D.$$

Figure 7:
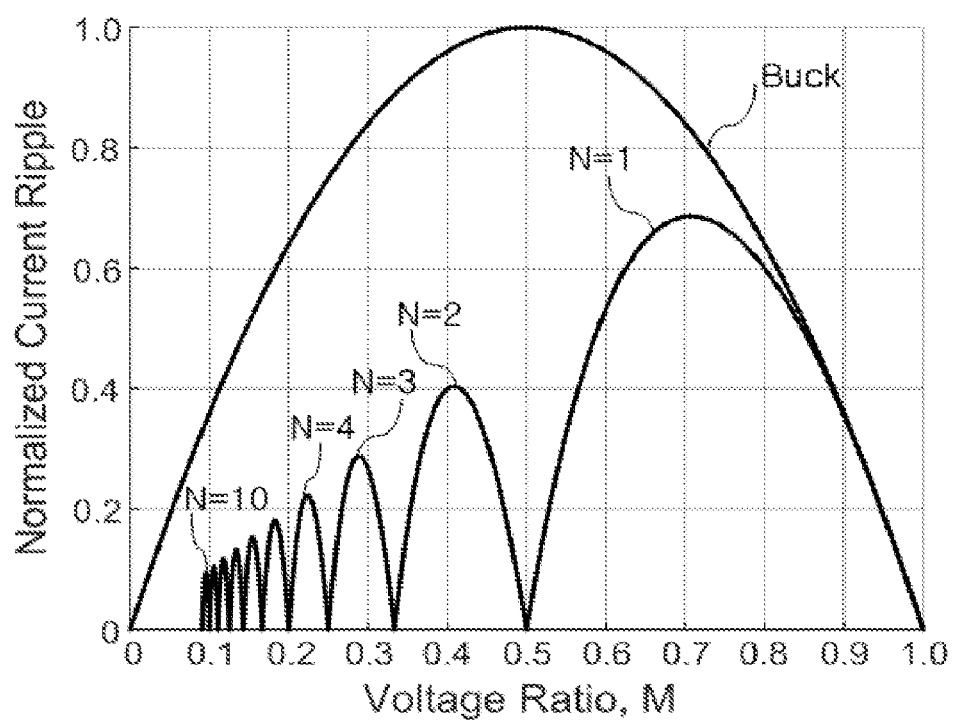
FIG. 7 illustrates a graph of an example inductor ripple reduction of a hybrid converter circuit compared to a Buck converter, according to one or more embodiments shown and described herein.

According to the two above equations, the benefit of the hybrid converter circuits provided herein can be confirmed. FIG. 7, for example, illustrates a comparison of inductor current ripples as a function of voltage ratio M in which the figures are normalized by the common factor $$\frac{V_{IN} T_s}{L}$$

and multiplied by 4 to make the point of maximum ripple of a Buck converter as a reference. It is noted that the current ripple is highly reduced in the example hybrid converter circuits resulting from the reduced voltage swing at $V_X$.

Regarding the switching loss, the example hybrid converter circuits also have advantages as the voltage stress is reduced to $V_{OUT}$. And this reduction can help to employ semiconductor switches with better on-resistance and dynamic performance.

Figure 8:
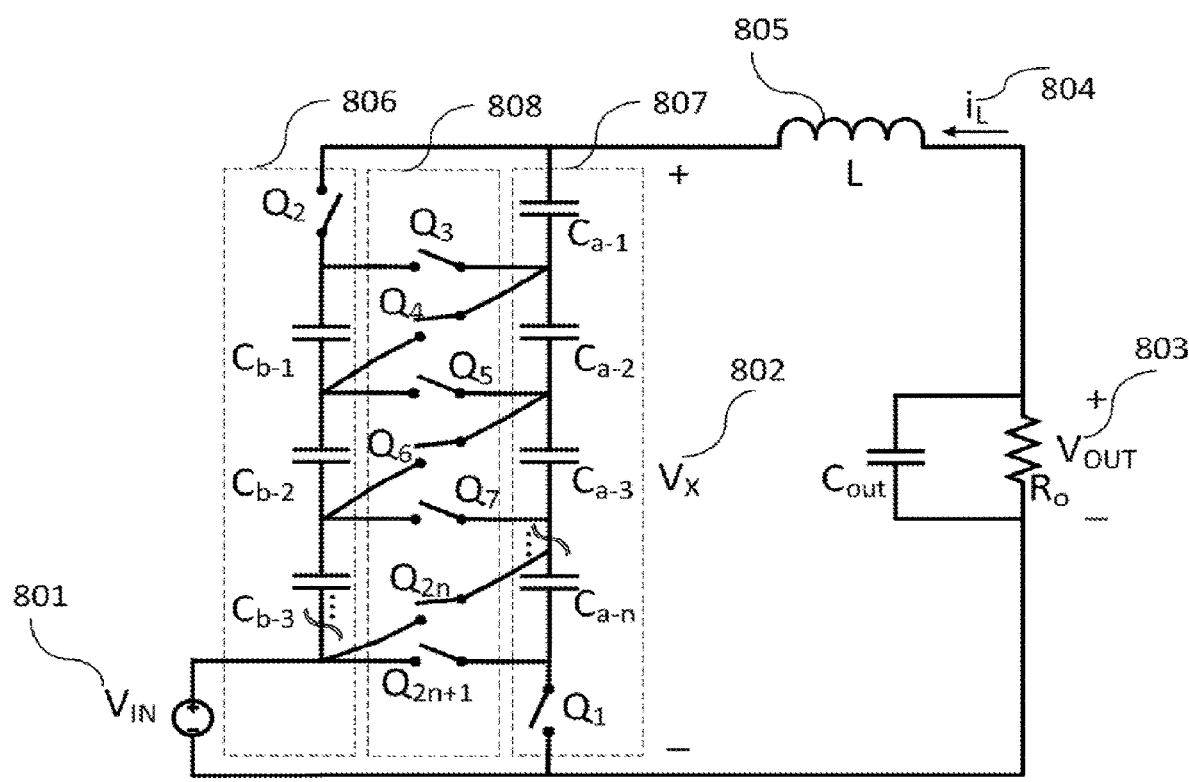
FIG. 8 illustrates a schematic drawing of an example hybrid converter circuit arranged as a step-up converter, according to one or more embodiments shown and described herein.

As mentioned earlier, the example hybrid converter circuits can also be configured for a step-up conversion by exchanging the locations of voltage source and load as illustrated in FIG. 8. The benefits of the circuit still exists: less inductor DC current, inductor current ripple, and switch voltage stress than conventional boost converter.

Figure 9:
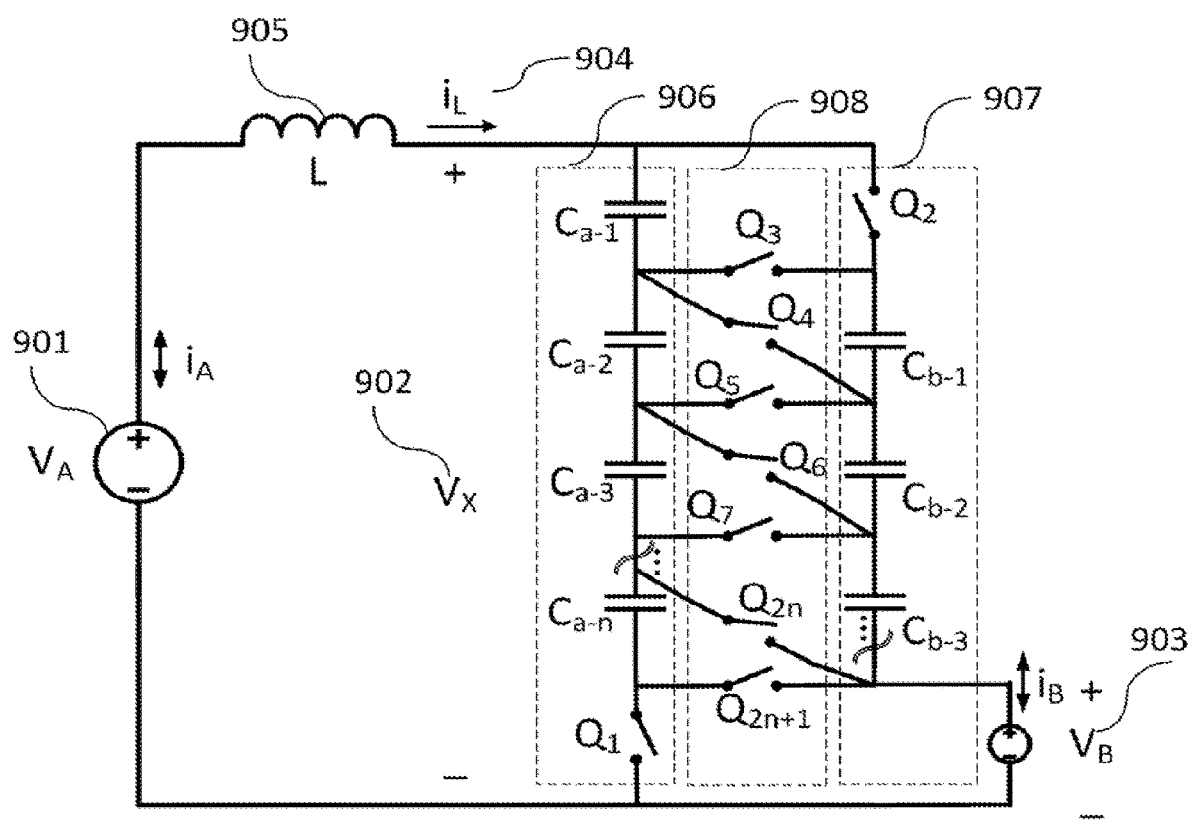
FIG. 9 illustrates a schematic diagram of an example hybrid converter circuit arrangement for a bidirectional power flow, according to one or more embodiments shown and described herein.

The example hybrid converter circuits, such as those shown in FIGS. 3A to 3C, can be also used for bidirectional power flow as shown in FIG. 9.

Figure 10:
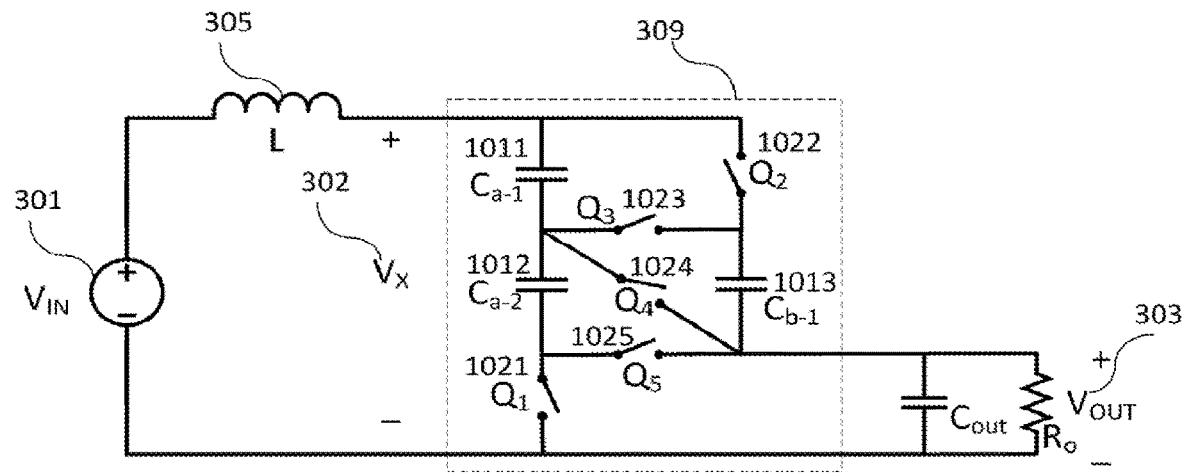
FIG. 10 illustrates schematic drawing of an example hybrid converter circuit implementation using three capacitors and five switches using ladder structure, according to one or more embodiments shown and described herein.

As a simple example realization of a hybrid converter circuit, a step-down converter 1000 can be constructed with two capacitors and three switches as illustrated in FIG. 10.

Figure 11:
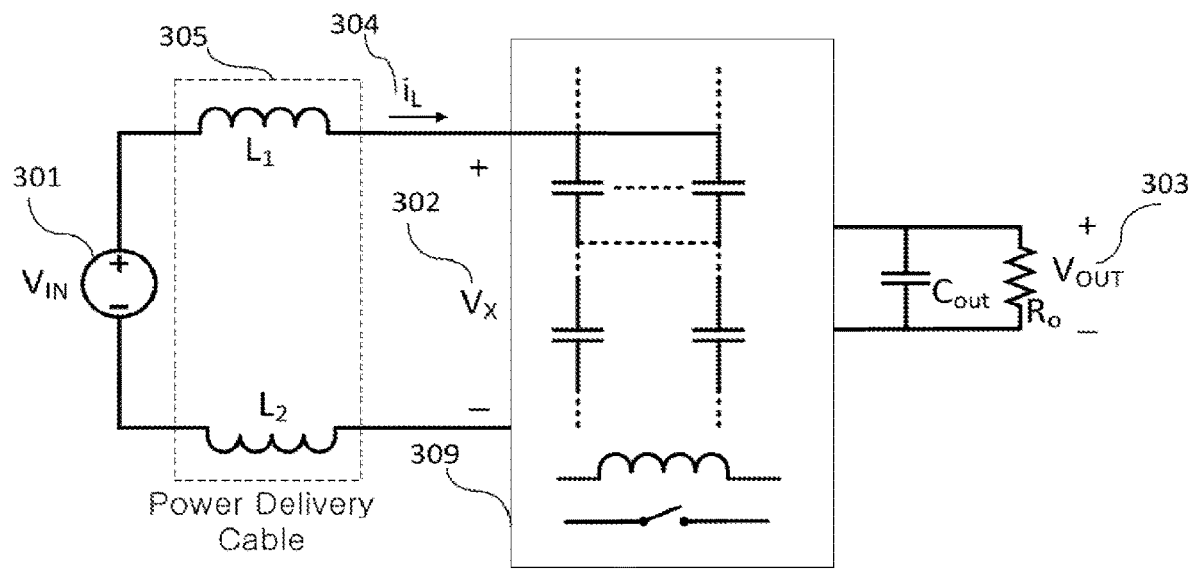
FIG. 11 illustrates a schematic drawing of an example hybrid converter circuit implementation using a cable parasitic inductance, according to one or more embodiments shown and described herein.

For better integration, the dedicated inductor can be replaced with an input or output cable or circuit parasitic inductance as shown in FIG. 11.

Figure 12:
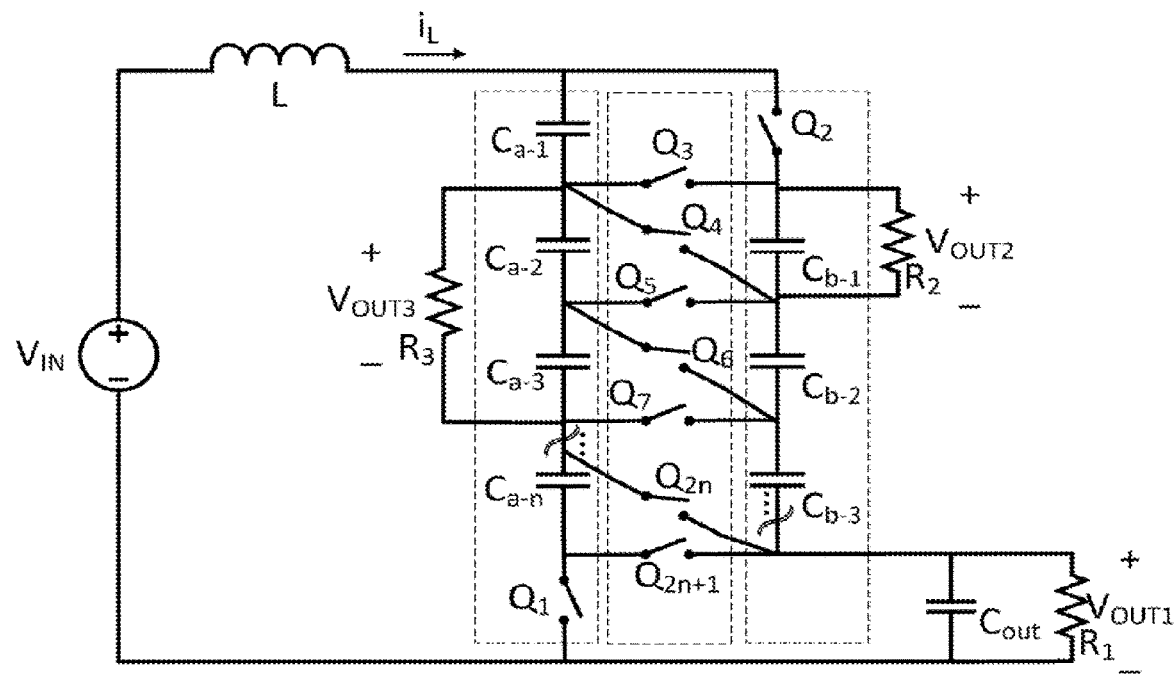
FIG. 12 illustrates a schematic drawing of an example hybrid converter circuit implementation for multiple loads, according to one or more embodiments shown and described herein.

As shown in FIG. 12, multiple loads can be attached to some hybrid converter circuit embodiments. Because the same voltage can be achieved from any capacitors in the circuit, any load which requires either the same output voltage level or multiple factors of it can be attached.

Example embodiments of hybrid converter circuits can also control the output 303 by using pulse width modulation (PWM) and/or pulse frequency modulation (PFM) control method. Additional techniques to improve circuit efficiency can also be utilized, such as burst mode control.

The operation principle discussed above was provided with continuous conduction mode (CCM) operation assumed, but discontinuous conduction mode (DCM) or boundary conduction mode (BCM) control can be also used.

Figure 13A:
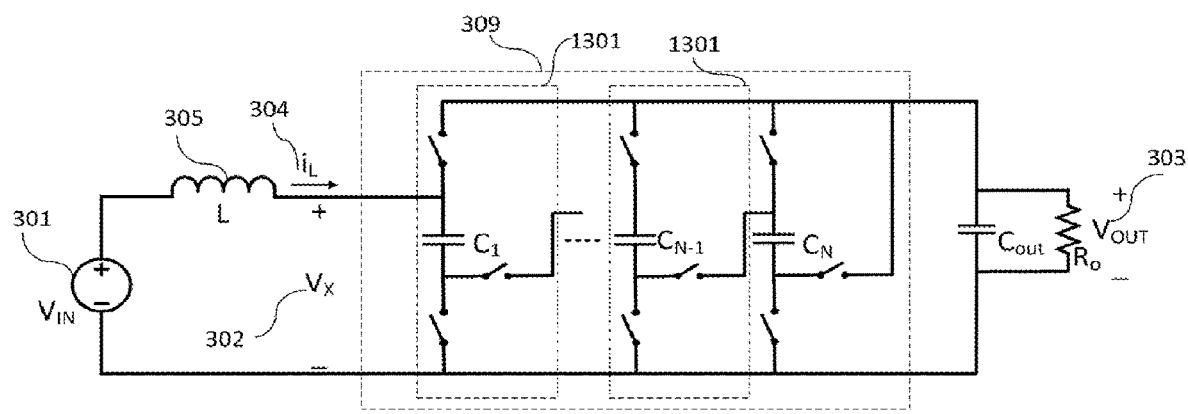
FIG. 13A illustrates a schematic drawing of an example hybrid converter circuit implementation with a series-parallel structure, according to one or more embodiments shown and described herein.

Again, the switched capacitor circuit structure 309 is not limited to a specific type of switched capacitor circuit but any type of switched capacitor circuits can be used. FIG. 13A, for example, shows another possible embodiment of a hybrid converter circuit that uses a series-parallel switched capacitor circuit structure 309. Depending on the system requirement, the number of basic cells 1301 can be integer number from 0 to N. As discussed earlier, the inductor L 305 is directly connected to one or a plural number of capacitors in switched capacitor circuit 309. The direct connection to capacitor enables to the circuit to reduce the number of switches and thus reduces conduction loss. While the converter input-to-output voltage conversion ratio of FIG. 13A is now $$M = \frac{V_{OUT}}{V_{IN}} = \frac{1}{(N+1) - ND},$$

a benefit that is reduced voltage swing at vx 302 is still valid and effective to reduce the inductor requirement.

Figure 13B:
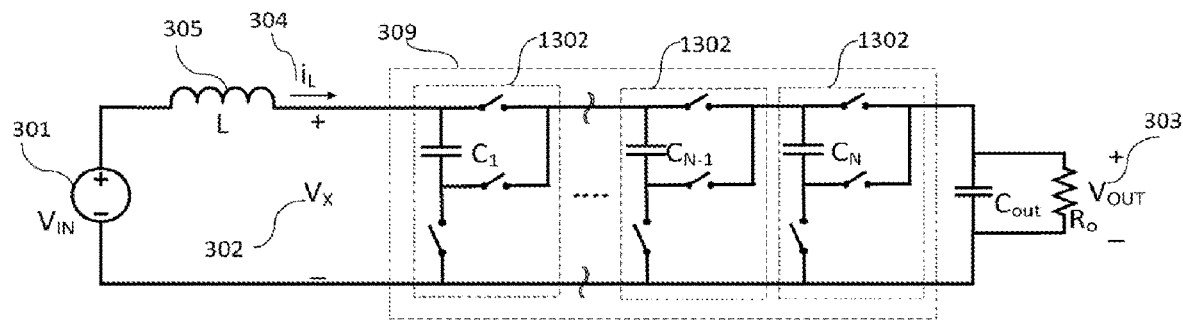
FIG. 13B illustrates a schematic drawing of an example hybrid converter circuit implementation with a Fibonacci structure, according to one or more embodiments shown and described herein.

FIG. 13B illustrates another possible embodiment of a hybrid converter circuit that uses a Fibonacci switched capacitor structure. Except the change of the conversion ratio, the benefits of direct connection of an inductor to a capacitor of a switched capacitor network and reduced inductance requirement remains.

Figure 13C:
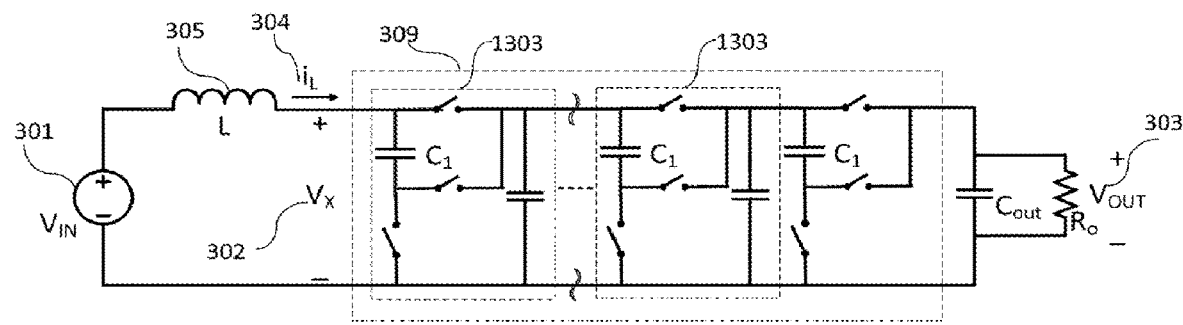
FIG. 13C illustrates a schematic drawing of an example hybrid converter circuit implementation with a doubler structure, according to one or more embodiments shown and described herein.

FIG. 13C illustrates another possible embodiment of a hybrid converter circuit that uses a doubler structure.

Figure 14:
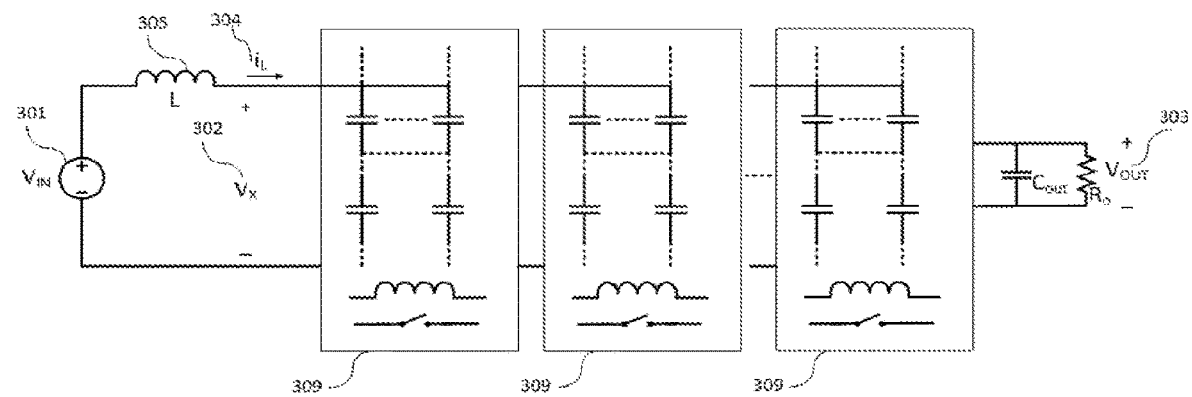
FIG. 14 illustrates a schematic diagram of another example embodiment of a hybrid converter circuit that uses two or more multiple switched capacitor network modules, according to one or more embodiments shown and described herein.

FIG. 14 illustrates a schematic diagram of another example embodiment of a hybrid converter circuit that uses two or more multiple switched capacitor network blocks to provide more functionality. Using this series connected structure enables the circuit to effectively operate with $V_{IN}$ 301 and/or $V_{OUT}$ 303 changing.

Figure 15A:
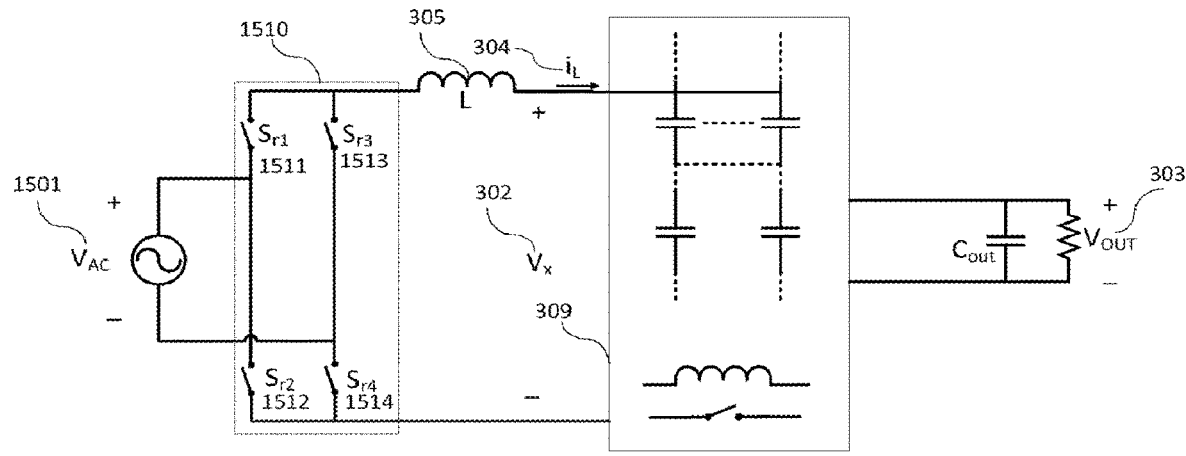
FIG. 15A illustrates a schematic diagram of another example embodiment of a hybrid converter circuit for AC-DC power conversion, according to one or more embodiments shown and described herein.

FIG. 15A illustrates a schematic diagram of another example embodiment of a hybrid converter circuit for AC-DC power conversion. In this particular embodiment, for example, a full-bridge switch leg 1510 can be added between AC source $V_{AC}$ 1501 and inductor 305 to fold the AC input and they can be implemented by passive switches.

Figure 15B:
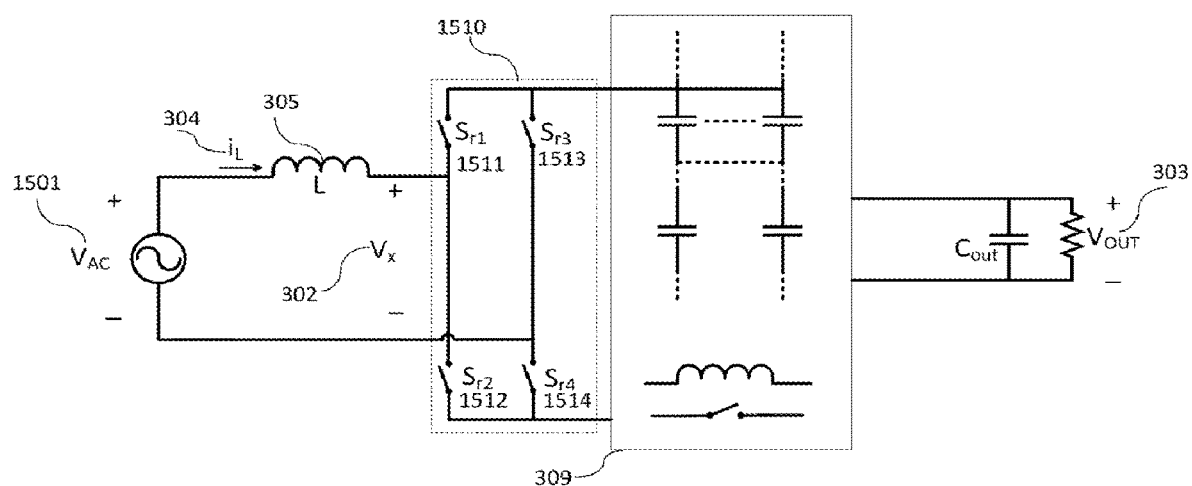
FIG. 15B illustrates a schematic diagram of another example embodiment of a hybrid converter circuit for AC-DC power conversion, according to one or more embodiments shown and described herein.

FIG. 15B illustrates a schematic diagram of another example embodiment of a hybrid converter circuit for AC-DC power conversion. In this embodiment, the full-bridge switch leg 1510 is now positioned between the inductor 305 and the multiple switched capacitor network 309 to achieve better functionality. Though the full bridge leg is added between inductor 305 and switched capacitor network 309, the benefit of this hybrid converter circuit embodiment still remains as the switches 1511, 1512, 1513 and 1514 are operated at grid frequency most of the time that is relatively very slow compared to the switching frequency of switched mode power converters.

The hybrid converters shown in FIGS. 15A and 15B can be used for a variety of applications e.g. AC-DC converters for data centers and other grid tied electric device power supply, AC-DC adapters for mobile devices, and microgrid system.

Figure 15C:
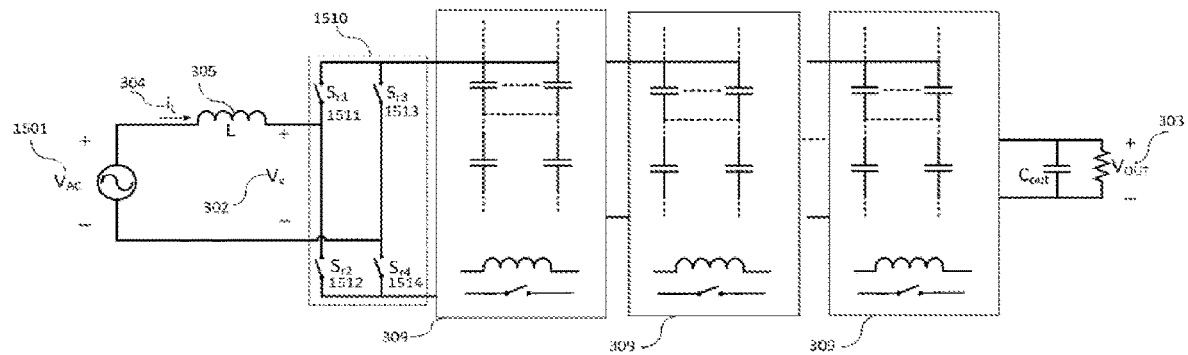
FIG. 15C illustrates a schematic diagram of another example embodiment of a hybrid converter circuit for AC-DC power conversion, according to one or more embodiments shown and described herein.

FIG. 15C illustrates a schematic diagram of another example embodiment of a hybrid converter circuit for AC-DC power conversion. In this embodiment, two or more multiple switched capacitor networks 309 are used. By constructing a series connection of switched capacitor networks 309, the possible number of switching node voltages can be increased.

Figure 16:
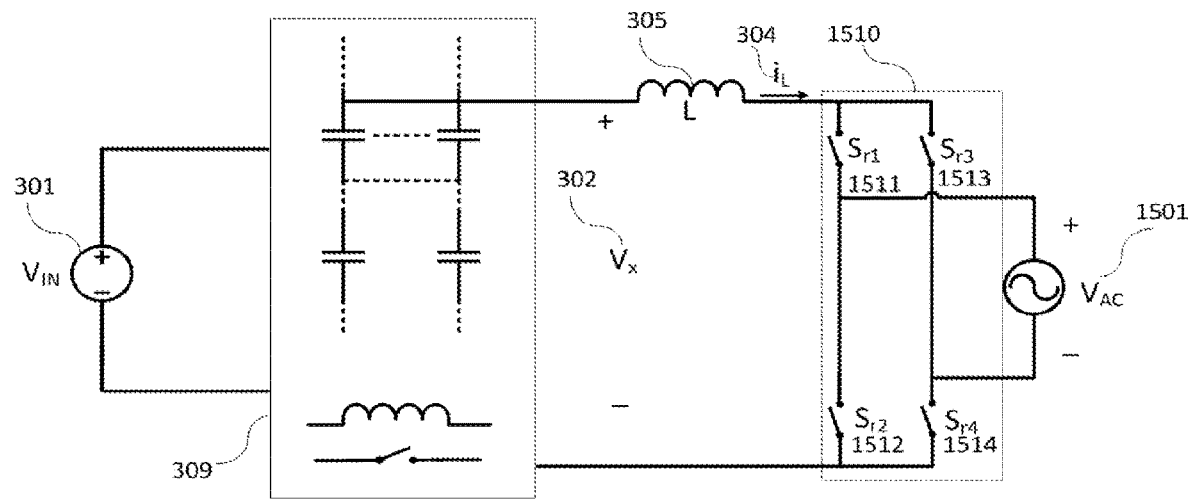
FIG. 16 illustrates a schematic diagram of another example embodiment of a hybrid converter circuit for DC-AC power conversion, according to one or more embodiments shown and described herein.

FIG. 16 illustrates a schematic diagram of another example embodiment of a hybrid converter circuit for DC-AC power conversion. In this embodiment, a DC source becomes an input 301 and an AC section becomes an output 1501. The DC source 301 can be any DC source such as solar array, storage devices like battery pack to be interfaced to AC utility. As discussed above, the location of full-bridge switch leg 1510 could be changed for more functionality.

Figure 17A:
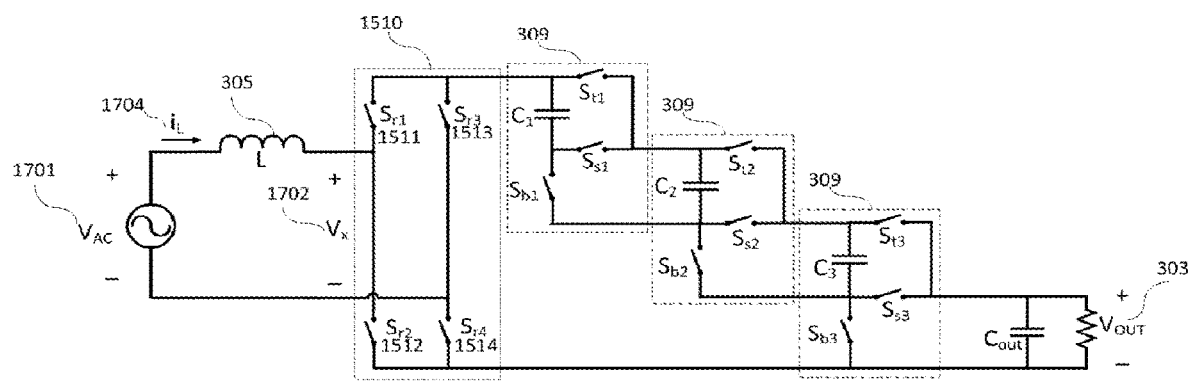
FIG. 17A illustrates a schematic diagram of another example embodiment of a hybrid converter circuit implementation for AC-DC power conversion using three switched capacitor networks arranged in series with a full-bridge switch leg, according to one or more embodiments shown and described herein.
Figure 17B:
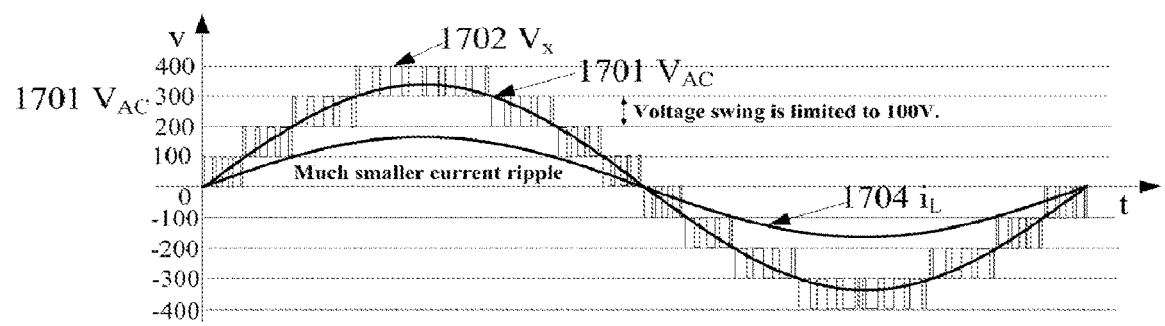
FIG. 17B illustrates a graph showing an example switching node voltage of the example hybrid converter circuit shown in FIG. 17A, according to one or more embodiments shown and described herein.
Figure 18A:
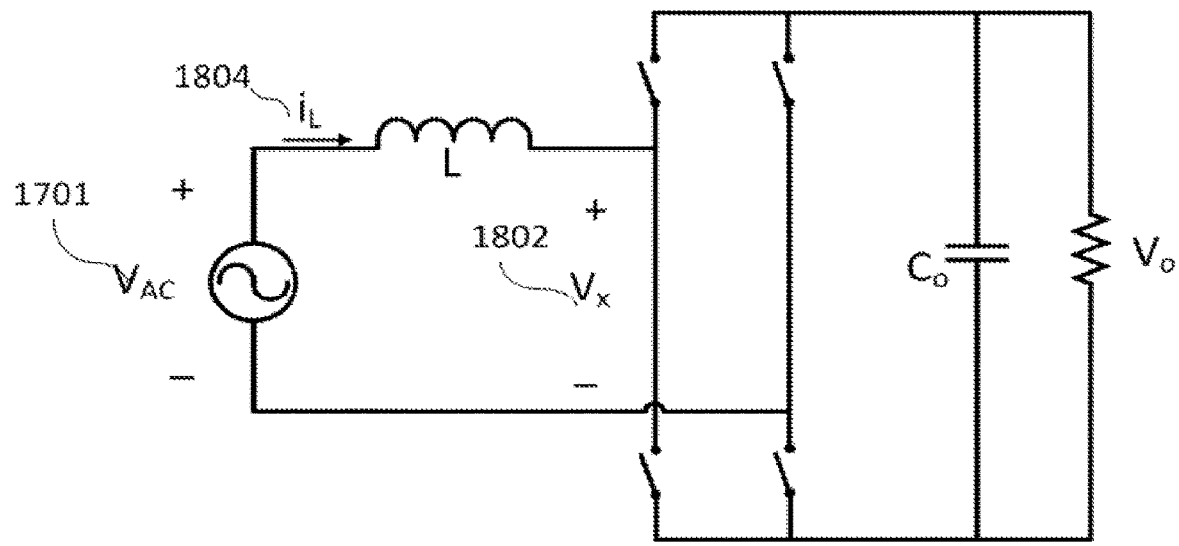
FIG. 18A illustrates a schematic diagram of another example embodiment of a hybrid converter circuit implementation for AC-DC power conversion, according to one or more embodiments shown and described herein
Figure 18B:
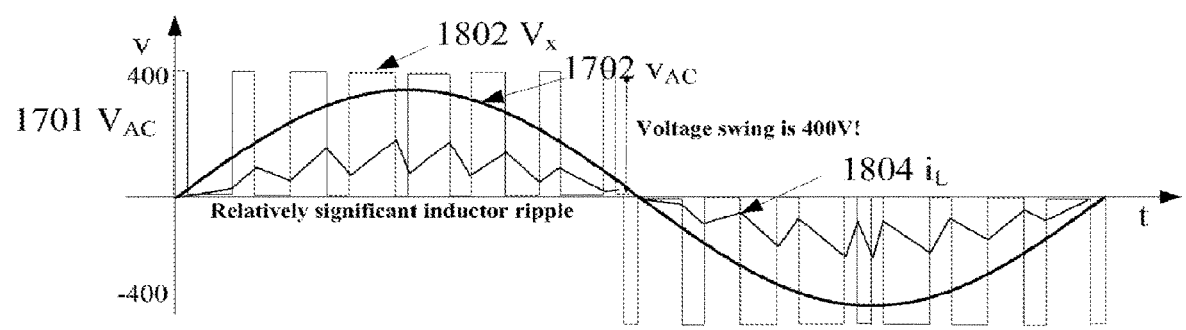
FIG. 18B illustrates a graph showing an example switching node voltage of the example hybrid converter circuit shown in FIG. 18A, according to one or more embodiments shown and described herein.

FIG. 17A illustrates a schematic diagram of another example embodiment of a hybrid converter circuit implementation for AC-DC power conversion using three switched capacitor networks 309 in series a full-bridge switch leg 1510. In this embodiment, each switch in the circuit can be synchronized and operated to switch the inductor and provide multiple level of voltages in a manner to reduce the ripple of current $i_L$ 1704 of inductor 305. As shown in FIG. 17B, the switching node voltage 1702 can be switched between nine levels: −400, −300, −200, −100, 0, 100, 200, 300, and 400V while the voltage of switching node 1802 of conventional bridgeless power factor correction boost converter shown in FIG. 18A can be just three: −400, 0, and 400 shown in FIG. 18B. Reducing the voltage swing helps to reduce the size of inductor 305 as well as reduce the voltage stress on switches in switched capacitor network 309 that enable using lower voltage rated transistors for better performance e.g. lower on-state resistance with less parasitic and better dynamic performance.

The example hybrid converter topologies provided can be applied to electronic platforms that utilize DC-to-DC power conversion. Non-limiting examples include televisions (TVs), video projectors, set-top boxes or set-top units, digital video recorders (DVR), computers, netbooks, laptops, and any other audio/visual equipment with computation capabilities. In these applications, the input voltage $V_{IN}$ 301 can come from a battery, or output of a grid-connected AC-to-DC adapter, or another type of power source, while the output voltage $V_{OUT}$ 303 can supply power to functional circuits, for example, processors, display, and communication. These loading functional circuits can be configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. The loading circuits at $V_{OUT}$ 303 can also provide a variety of user interfaces such as a keyboard, a touch screen, a trackball, a touch pad, and/or a mouse. The loading circuits at $V_{OUT}$ 303 may also include speakers and a display device in some embodiments. The loading circuits at $V_{OUT}$ 303 can also include a bio-medical electronic device.

Although embodiments of this invention have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. For example, two elements coupled between a pair of terminals are not necessarily coupled directly to the terminals, but there may be one or more other circuit element disposed between the terminal(s) and the elements coupled between those terminals. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A step down converter driving a load comprising in combination:

a voltage source having a first terminal and a second terminal;

a first series connection of first multiple capacitors connected in series with a first switch, the first switch connected to the first terminal of the voltage source;

a second series connection of second multiple capacitors connected in series with a second switch, wherein an end of the second multiple capacitors is connected to the first terminal of the voltage source;

an inductor having a first inductor terminal and a second inductor terminal, wherein:

the first inductor terminal is connected to the second terminal of the voltage source, and the second inductor terminal is connected to a first capacitor of the first series connection of the first multiple capacitors and the first switch, and the second terminal of the inductor is also connected to the second series connection of the second multiple capacitors and the second switch;

third multiple switches each having a first switch terminal and a second switch terminal;

the first switch terminal of each of the third multiple switches connected to first common nodes of the first series connection of the first multiple capacitors and the first switch, the second switch terminal of each of the third multiple switches connected to second common nodes of the second series connection of the second multiple capacitors and the second switch and each of the third multiple switches positioned between the first common nodes or the second common nodes connecting either the same order of first common nodes of the first series connection of the first multiple capacitors and the first switch and second common nodes the second series connection of the second multiple capacitors and the second switch, or (N)th common nodes of the first series connection of the first multiple capacitors and the first switch and (N+1)th common node of the second series connection of the second multiple capacitors and the second switch; and a load connected in parallel to a last capacitor of the second series connection of the second multiple capacitors and the second switch.

* * * * *